(No Model.)
J. WOLF, Jr.
CLUTCH.
No. 503,923. Patented Aug. 22, 1893.
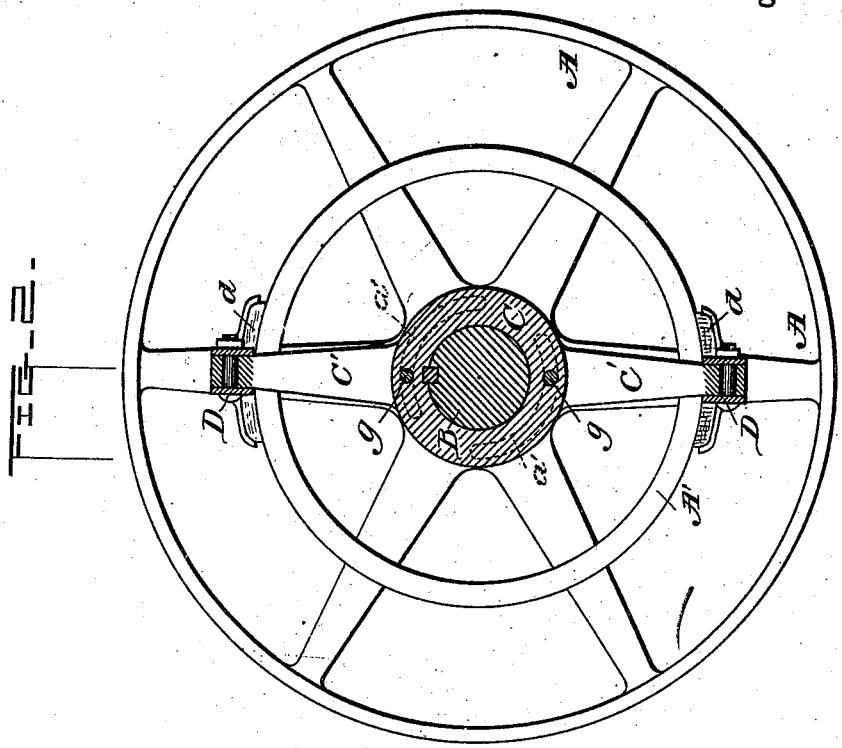
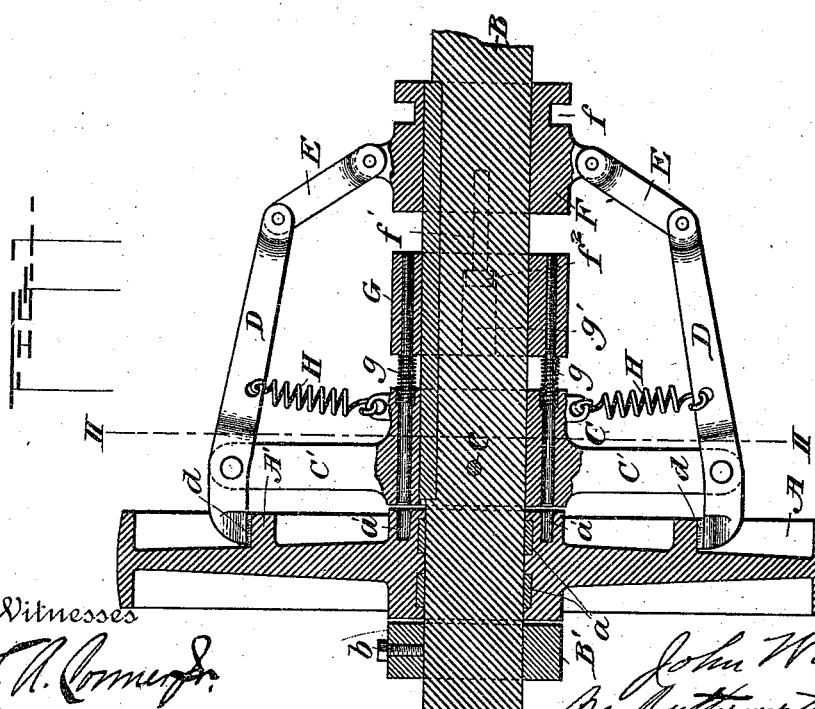
Witnesses
T. N. Conner Jr.
Chas. E. Riordon
Inventor
John Wolf Jr.
By Butterworth & Dowell
his Attorneys

UNITED STATES PATENT OFFICE.

JOHN WOLF, JR., OF CINCINNATI, OHIO, ASSIGNOR OF ONE-HALF TO JACOB BLOCH, OF SAME PLACE.

CLUTCH.

SPECIFICATION forming part of Letters Patent No. 503,923, dated August 22, 1893.

Application filed May 17, 1893. Serial No. 474,576. (No model.)

*To all whom it may concern:*

Be it known that I, JOHN WOLF, Jr., a citizen of the United States, residing at Cincinnati, in the county of Hamilton and State of Ohio, have invented certain new and useful Improvements in Friction-Clutches; and I do hereby declare the following to be a full, clear, and exact description of the invention, such as will enable others skilled in the art to which it appertains to make and use the same.

This invention relates to improvements in friction clutches.

The primary object of the invention is to provide means for first frictionally engaging and causing a band-wheel or pulley to rotate with the driving shaft and then locking the same to the shaft so that the pulley shall not slip so long as the clutch devices are engaged.

A further object is to provide a friction clutch which shall be simple in construction, inexpensive in manufacture and efficient and reliable in use.

The invention will first be described with reference to the accompanying drawings, which form a part of this specification, and then particularly pointed out in the claims at the end of the description.

Referring to the drawings, in which similar letters are used to denote similar parts in the different views, Figure 1 represents a longitudinal sectional elevation of a friction clutch embodying my invention, and Fig. 2 is a sectional end elevation on the line II—II of Fig. 1.

The band-wheel or pulley A, is placed loosely on the main or driving shaft B, so as to revolve freely thereon independently of the shaft, and the hub thereof is preferably provided with annular recesses in which may be fitted Babbitt or other anti-friction metal, as indicated at $a$. The pulley A, is confined against endwise movement on the shaft between a collar B', and the hub of the spider C, C', which parts may be secured to the shaft so as to rotate therewith by means of set screws $b$, $c$, as shown, or in any proper manner. The pulley A, at the side thereof adjacent to the spider is provided or formed with a cylindrical flange A', and its hub at the same side is provided with curved or arc slots $a'$, for a purpose to be described. The spider may consist of a hub C, and two (more or less) radial arms C', to which are pivoted clutch levers D, D, to the shorter arms of which are fixed clutch blocks $d$, of wood or other fibrous material, which are adapted to impinge upon the ring or flange A', so as to compel the pulley to rotate with the shaft. The levers D, D, have a toggle-joint connection with links E, E, the opposite ends of which are pivoted to a sliding collar or sleeve F, which is keyed to the driving shaft B, by spline and groove, or other suitable connection, so that the collar may move longitudinally upon and also rotate with the shaft. By this means, as will be seen, when the collar F is moved toward the pulley pressure will be applied through the toggle-levers D, E, upon the rim or flange A', causing the blocks $d$, $d$, to exert an increasing pressure upon the flange so as to frictionally engage and bind the pulley to the spider sufficiently to cause the pulley and spider to rotate together with the shaft. For convenience of operation the collar F, may be grooved, as at $f$, to receive a strap which may be connected with an operating lever in a well-known manner for the purpose of sliding the collar along the shaft.

Between the spider hub C, and collar F, is placed a second sliding collar or sleeve G, from which pins $g$, $g$, project through openings in the hub of the spider in position to engage the arc slots $a'$, in the hub of the pulley when the sleeve G, is slid inward or toward the pulley, so as to lock the pulley to the spider and compel the two to rotate together as one and thereby prevent the pulley from slipping. The collar G, may be connected with the collar F, by a headed bolt or bolts $f'$, projecting from the collar F, with the head or heads $f^2$, thereof fitting in an opening or openings $g'$, extending partially through the collar G, so that the bolt $f'$, may have a limited movement independent of said collar to permit the latter to remain stationary until the collar F, has moved inward sufficiently to cause the clutch blocks to engage the circular flange A', and start the pulley, whereupon the collar F, by contact with the collar G, will slide the latter toward the pulley and cause the pins $g$, to engage the arc slots $a'$, and thus lock the pulley to the shaft.

Coiled or other suitable springs H, H, may connect the long arms of the levers D, with the hub of the spider, or other suitable part of the clutch mechanism, so as to exert a constant inward pull upon the long arms of the clutch levers, tending to disengage the clutch blocks and serving to hold the parts disengaged when the operating lever (not shown) is released.

The operation of my invention will be readily understood from the foregoing description taken in connection with the accompanying drawings. When the operating lever is moved so as to force the collar F, inward toward the pulley A, the toggle-jointed levers will exert a gradually increasing force tending to bind the clutch blocks to the circular flange on the pulley, whereby the latter will be frictionally engaged with the shaft and caused to rotate therewith, and as the inward movement of the collar continues the collar G, will be slid inward so as to engage the locking pins $g$, with the arc slots $a'$, and when the pins reach the ends of the arc slots the pulley will be firmly locked to the shaft so as to prevent slipping. On the reverse movement of the lever, toward the completion of the outward movement of the collar F, the head of the bolt $f'$, reaching the bottom of the opening or recess in the collar G, will cause the latter to move outward with the collar F, and withdraw the locking pins simultaneously with the act of disengaging the clutch blocks from the circular flange.

This clutch may also be used for the purpose of coupling the abutting ends of two independent shafts or shaft sections, in which case the pulley will be placed upon the end of one shaft and the spider, sliding collar and intermediate sliding sleeve carrying the locking pins will be placed on the abutting end of the adjacent shaft or shaft section. It may also be desirable in some cases to provide countersinks in the openings in the hub of the spider through which the locking pins pass, in which may be seated coiled or other suitable springs, as shown in Fig. 1, surrounding the pins and pressing the sleeve outward to prevent the sleeve from moving inward until engaged by the sliding collar. Other equivalent means may also be substituted for the sliding pins for the purpose of locking the parts together after the speed of the pulley has attained approximately the speed of the driving shaft to which it is to be locked.

Having thus fully described my invention, what I claim as new, and desire to secure by Letters Patent of the United States, is—

1. The band wheel or pulley provided at one side with a circular flange or ring and having arc slots in the hub thereof, in combination with the hub having radial arms, the sleeve adjacent to said hub carrying locking pins adapted to engage said arc slots, the collar adjacent to said sleeve, clutch levers pivotally supported upon said radial arms and adapted to impinge at one end upon said flange and having their outer ends pivoted to connecting links the opposite ends of which are pivoted to said collar, substantially as described.

2. The band wheel or pulley provided at one side with a circular flange or ring and having arc slots in the hub thereof, in combination with the hub having radial arms, the sleeve adjacent to said hub carrying locking pins adapted to engage said arc slots, the collar adjacent to said sleeve, clutch levers pivotally supported upon said radial arms and adapted to impinge at one end upon said flange and having their outer ends pivoted to connecting links the opposite ends of which are pivoted to said collar, and springs tending to disengage said clutch levers and locking pins, substantially as described.

3. A friction clutch comprising the pulley loose on the main driving shaft, the sliding collar keyed on said shaft, the spider, the pivoted levers carrying the clutch blocks, the links connecting said levers and collar, the intermediate sliding collar or sleeve carrying the locking pins adapted to engage arc slots in the hub of the pulley, and connections between said sliding collar and sleeve, whereby the pulley will be frictionally geared to the driving shaft on the initial movement of the clutch operating collar and locked thereto on the continuation of this movement by said locking pins, substantially as described.

4. In combination with the circular flange, the spider, the pivoted clutch levers provided with the clutch blocks, the sliding collar, the links pivotally connecting said levers and collar, the springs tending to disengage said clutch blocks, the sleeve placed between said collar and spider, and means carried by said sleeve for locking the pulley to the spider at a predetermined point in the movement of the clutch levers, whereby the pulley is first frictionally geared to the driving shaft and then locked thereto, substantially as described.

5. In combination with the loose pulley having arc slots in the hub thereof, the clutch levers and collar and means for frictionally gearing said pulley to the main driving-shaft, mechanism adapted to operate at a predetermined point in the movement of the friction gearing and lock the pulley to the shaft, comprising a sliding sleeve carrying locking pins for engaging said arc slots in the hub of the pulley and connections between said sleeve and collar for operating the same, whereby on the forward movement of said collar said pulley will first be frictionally engaged and caused to turn with the shaft and then locked to the shaft, and vice versa, substantially as described.

6. In a friction clutch, the combination with the pulley loose on the main driving shaft and provided with arc slots in the hub thereof and with a circular flange or ring, of the sliding collar keyed on said shaft, the pivoted levers connected with clutch blocks which are adapted to impinge on said flange, the links connecting said levers and collar, and the intermediate sliding collar or sleeve carrying locking pins adapted to engage said arc slots in the hub of the pulley, substantially as described.

In testimony whereof I affix my signature in presence of two witnesses.

JOHN WOLF, JR.

Witnesses:
T. J. COLLINS,
WM. LAUDWEHR.